Dec. 20, 1960 R. W. DE MONTE 2,965,859

SIMULATION NETWORK

Filed Feb. 27, 1959 2 Sheets-Sheet 1

INVENTOR
R. W. DE MONTE
BY Ralph T. Holcomb
ATTORNEY

Dec. 20, 1960 R. W. DE MONTE 2,965,859
SIMULATION NETWORK
Filed Feb. 27, 1959 2 Sheets-Sheet 2

INVENTOR
R. W. DE MONTE
BY
Ralph P. Holcomb
ATTORNEY

United States Patent Office
2,965,859
Patented Dec. 20, 1960

2,965,859
SIMULATION NETWORK

Robert W. De Monte, Berkeley Heights, N.J., assignor to Bell Telephone Laboratories, Incorporated, New York, N.Y., a corporation of New York Filed Feb. 27, 1959, Ser. No. 796,105
4 Claims. (Cl. 333—23)

This invention relates to wave transmission networks and more particularly to a simulation network or artificial line.

The object of the invention is to simulate a length of smooth transmission line in both image impedance and propagation over a wide band of frequencies. Related objects are to simplify the structure, increase the precision, and widen the band of a simulation network.

In many wave transmission systems, the need often arises for a simple, easily designed network which will closely simulate the image impedance and propagation characteristics of a section of smooth transmission line over a wide band of frequencies. Such networks are especially useful in telephone, telegraph, and data transmission systems, and in test circuits for such systems.

The network of the present invention fulfills these requirements in a symmetrical lattice structure adapted to simulate any fractional part of a loading section of smooth transmission line. The branches of the lattice may be synthesized directly from impedance and transmission measurements made on a half section of the line at frequencies near the edges of the band. For a critical length of section, each series branch of the lattice comprises only a resistor. For longer sections, a parallel capacitor is added. For shorter sections, a second resistor and an inductor are included. Each diagonal branch is the equivalent of a resistor in series with the parallel combination of a second resistor and a capacitor. In some cases, a series inductor is desirable in the diagonal branch.

With these comparatively simple simulation networks, a frequency band of more than two decades may be covered with a design error of less than 0.5 percent in both the real and the imaginary parts of the image impedance and the propagation constant of the line section. The design method is perfectly straightforward and avoids any cut-and-try procedure. With the aid of suitable loading coils, the networks may be used to simulate the transmission characteristics of any type of loaded line or cable having any fractional length of end section.

The nature of the invention and its various objects, features, and advantages will appear more fully in the following detailed description of the typical embodiments illustrated in the accompanying drawing, of which:

Figure 8:
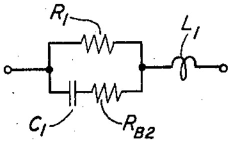
Figure 9:
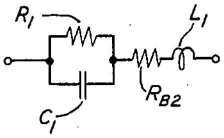
Figure 10:
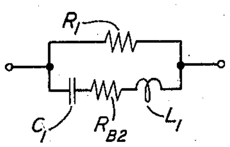
Figure 12:
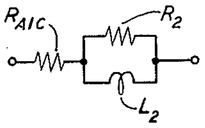
Figure 11:
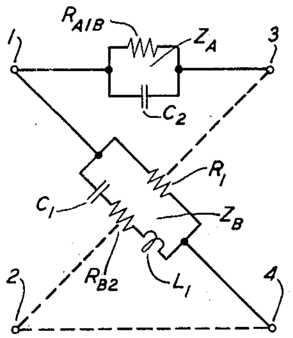
Figure 13:
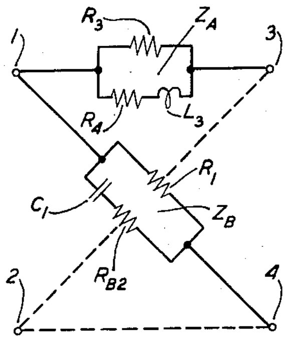

Figs. 8, 9, and 10 show equivalent circuits of the diagonal branch when an inductor is included;

Figs. 11 and 13 are schematic circuits of simulation networks in accordance with the invention for line sections with lengths, respectively, longer and shorter than critical; and Fig. 12 shows an equivalent circuit of the series branch of Fig. 13.

Figure 1:
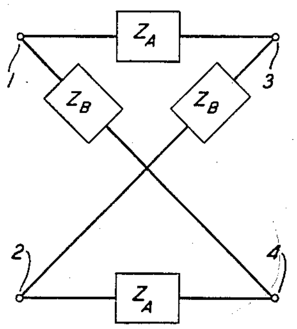
Fig. 1 is a generalized schematic circuit of a simulation network in accordance with the invention.

As shown in Fig. 1, the simulation network in accordance with the present invention is a symmetrical lattice structure comprising two equal series impedance branches $Z_A$ and two equal diagonal branches $Z_B$ connected between a pair of input terminals 1, 2 and a pair of output terminals 3, 4.

Figure 2:
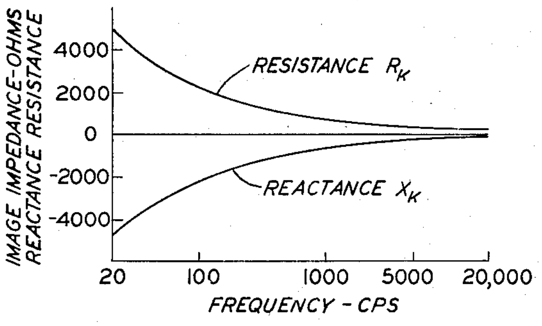
Fig. 2 is a graph of the resistive and reactive components of the image impedance of a typical section of smooth transmission line over the frequency band of interest.

Fig. 2 shows the resistive component $R_K$ and the reactive component $X_K$ of the image impedance $Z_K$ of a typical transmission line to be simulated. A logarithmic scale is used for the frequency, which covers a range of 20 to 20,000 cycles per second. The impedance shown is that of a cable using 26-gauge copper wire. This impedance may be computed from the primary constants of the line, or it may be found by measuring the open-circuit impedance $Z_{OC}$ and the short-circuit impedance $Z_{SC}$ of the section at frequencies throughout the range of interest and using the formula $$Z_K=\sqrt{Z_{OC}Z_{SC}}=R_K+jX_K \quad (1)$$

Figure 3:
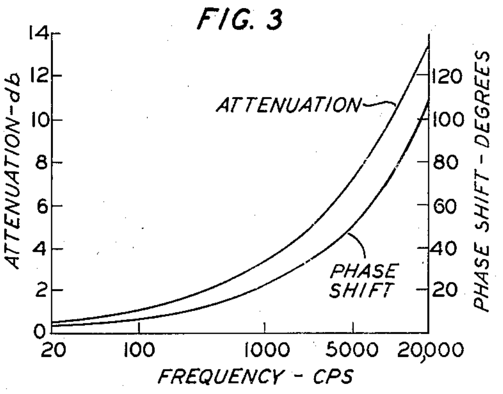
Fig. 3 is a graph of the attenuation and phase shift per 6000 feet of the line over the band.

Fig. 3 gives the attenuation in decibels and the phase shift in degrees of a 6000-foot section of this cable.

Figure 4:
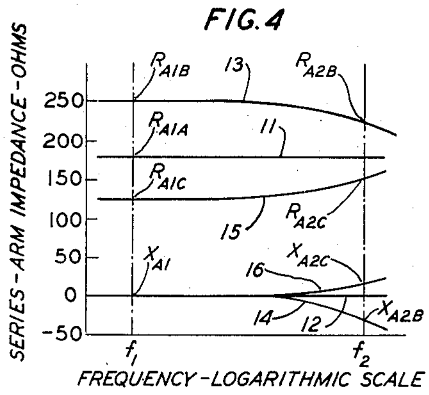
Fig. 4 shows three typical impedance characteristics of the series branches of lattice networks for simulating sections of line which are, respectively, equal to, shorter than, or longer than the critical length.

The lattice network shown in Fig. 1 will exactly simulate a section of smooth line of length S if the branch impedances $Z_A$ and $Z_B$ are equal, respectively, to the short- and open-circuit impedances of a half section having a length of S/2. Fig. 4 shows the required resistance and reactance characteristics of the series branch $Z_A$ for three typical cases which will be designated A, B, and C. Case A is for a section of line of critical length $S_A$, case B for a longer length $S_B$, and case C for a shorter length $S_C$. The frequencies $f_1$ and $f_2$ are located at or near the limits of the band of interest. For case A, the resistive component 11 is substantially constant over the band and the reactive component 12 is substantially zero. For case B, the resistive component 13 is falling and the reactive component 14 is negative and increasing in magnitude at the higher frequencies. For case C, the resistive component 15 is rising and the reactive component 16 is positive and rising in the vicinity of $f_2$. All of these curves are smooth and monotonic between $f_1$ and $f_2$.

Figure 5:
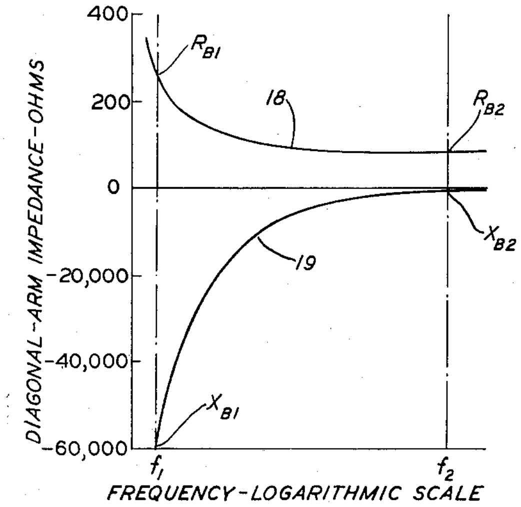
Fig. 5 shows a typical impedance characteristic of the diagonal branch of a lattice network for simulating a section of line of any length.

In Fig. 5, the curve 18 shows the resistive component and the curve 19 the reactive component of a typical impedance $Z_B$ required for each of the diagonal branches of the lattice. The resistance falls monotonically and the reactance is negative, decreases monotonically, and approaches zero at the higher frequencies. These curves are of this form for all three cases A, B, and C.

Figure 6:
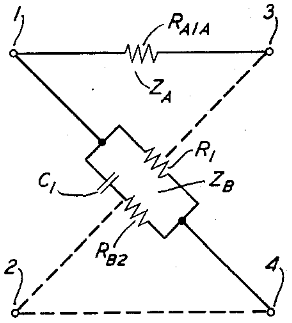
Fig. 6 is a schematic circuit of a simulation network in accordance with the invention for a line of critical length.

The next step is to synthesize impedance branches $Z_A$ and $Z_B$ which will give the required simulation over the band with the least number of elements. In accordance with the invention, the synthesis is based upon the required resistance and reactance values at only the two frequencies $f_1$ and $f_2$, which are 100 and 10,000 cycles per second in the following examples. The simplest structure is required for case A, where the line to be simulated has a critical length $S_A$ of 4229 feet in the example chosen. The lattice circuit is shown in Fig. 6.

Only one series branch $Z_A$ and one diagonal branch $Z_B$ are shown. The omitted branches are represented by the broken lines between the terminals 2, 3 and 2, 4. Each impedance $Z_A$ is constituted by a resistor having a value equal to the short-circuit resistance of a half section of the line with a length equal to $S_A/2$, at the frequency $f_1$. As read from the curve 11 of Fig. 4, this value is $R_{A1A}$.

Each diagonal branch $Z_B$ comprises a resistor $R_1$ shunted by the series combination of a resistor $R_{B2}$ and a capacitor $C_1$. The resistor $R_{B2}$ has a value equal to the open-circuit resistance of the half section at the frequency $f_2$, as is indicated in Fig. 5. The value of the resistor $R_1$ is equal to the reciprocal of the open-circuit conductance $G_{B1}$ of the half section at $f_1$. In terms of the resistance $R_{B1}$ and the reactance $X_{B1}$ shown on Fig. 5, $$R_1=\frac{1}{G_{B1}}=\frac{R_{B1}^2+X_{B1}^2}{R_{B1}} \quad (2)$$

The capacitor $C_1$ has a value equal to the open-circuit susceptance $B_{B1}$ of the half section at $f_1$ divided by $2\pi f_1$. The formula is $$C_1=\frac{B_{B1}}{2\pi f_1}=\frac{X_{B1}}{2\pi f_1(R_{B1}^2+X_{B1}^2)} \quad (3)$$

In the present example of case A, the component elements have the following values:

| | | |
|---|---|---|
| $R_1$ | ohms | 14,000,000 |
| $R_{A1A}$ | do | 177.2 |
| $R_{B2}$ | do | 62.0 |
| $C_1$ | microfarad | 0.03172 |

Figure 7:
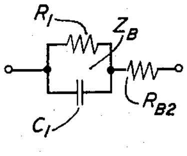
Fig. 7 shows an equivalent circuit of the diagonal branch of Fig. 6.

As shown in Fig. 7, the resistor $R_1$ in the diagonal branch $Z_B$ may be shunted across the capacitor $C_1$ only, if desired. Since $R_1$ is so large, the value of the impedance branch is substantially unchanged.

When the band between $f_1$ and $f_2$ is extremely wide, or when $f_2$ is high, a series inductor $L_1$ may be added to the diagonal branch $Z_B$ to improve the simulation at the higher frequencies. The reactance of $L_1$ is made equal to the difference between the reactance of $C_1$ and the desired reactance $X_{B2}$ at $f_2$. Thus, the inductance of $L_1$ is $$L_1=\frac{1/2\pi f_2C_1-X_{B2}}{2\pi f_2} \quad (4)$$

Figs. 8, 9, and 10 show substantially equivalent circuits for $Z_B$ with $L_1$ added. In the present example of case A, $L_1$ is so small that it may be omitted.

Fig. 11 is a schematic circuit of a typical example of a case B network, to simulate a section of line of length $S_B$ equal to 6000 feet. Each diagonal branch $Z_B$ is the same as the one shown in Fig. 10. The component elements are evaluated as described above except that the open- and short-circuit impedances apply to a half section of length $S_B/2$ instead of $S_A/2$.

The series branch $Z_A$ comprises a resistor $R_{A1B}$ and a capactior $C_2$ connected in parallel. The value of the resistor is equal to the short-circuit resistance of the half section at $f_1$, as found on the curve 13 in Fig. 4. The capacitor $C_2$ has a value equal to the short-circuit susceptance $B_{A2B}$ of the half section at $f_2$ divided by $2\pi f_2$. The formula is $$C_2=\frac{B_{A2B}}{2\pi f_2}=\frac{X_{A2B}}{2\pi f_2(R_{A2B}^2+X_{A2B}^2)} \quad (10)$$

The elements in the example of case B shown in Fig. 11 have the following values:

| | | |
|---|---|---|
| $R_1$ | ohms | 14,300,000 |
| $R_{A1B}$ | do | 250.0 |
| $R_{B2}$ | do | 86.2 |
| $C_1$ | microfarad | 0.04484 |
| $C_2$ | do | 0.00752 |
| $L_1$ | henry | 0.000071 |

Fig. 12 shows the series branch $Z_A$ for case C, in which the section to be simulated has a length $S_C$ shorter than $S_A$. The branch comprises a resistor $R_{A1C}$ in series with the parallel combination of a second resistor $R_2$ and an inductor $L_2$. As in th other cases, $R_{A1C}$ has a value equal to the short-circuit resistance of a half section of line of length $S_C/2$ at $f_1$. The value is shown on the curve 15 in Fig. 4. The elements $R_2$ and $L_2$ are added to take care of the rising character of the curves 15 and 16. Their values depend upon the difference between the short-circuit resistances $R_{A2C}$ and $R_{A1C}$ and the difference between the short-circuit reactances $X_{A2C}$ and $X_{A1}$ at the frequencies $f_2$ and $f_1$, as shown in Fig. 4. The element values are found from the formulas $$R_2=\frac{(R_{A2C}-R_{A1C})^2+(X_{A2C}-X_{A1})^2}{R_{A2C}-R_{A1C}} \quad (5)$$

$$L_2=\frac{(R_{A2C}-R_{A1C})^2+(X_{A2C}-X_{A1})^2}{2\pi f_2(X_{A2C}-X_{A1})} \quad (6)$$

It is sometimes desirable to transform the series branch $Z_A$ of Fig. 12 into the equivalent branch shown in Fig. 13. Here, $Z_A$ comprises a resistor $R_3$ shunted by the series combination of a resistor $R_4$ and an inductor $L_3$. The conversion formulas are the following:

$$R_3=R_2+R_{A1C} \quad (7)$$

$$R_4=R_{A1C}+\frac{R_{A1C}^2}{R_2} \quad (8)$$

$$L_3=L_1\left(1+\frac{R_{A1C}}{R_2}\right)^2 \quad (9)$$

In this circuit, the value of $R_4$ may be reduced to allow for the inherent resistance associated with $L_3$.

The diagonal branch $Z_B$ in Fig. 13 is the same as the one shown in Fig. 6 except that the elements are evaluated from the open-circuit impedance of a half section of length $S_C/2$.

As an example of case C, a network to simulate a line 3000 feet long will have the following element values:

| | | |
|---|---|---|
| $R_1$ | ohms | 34,700,000 |
| $R_3$ | do | 167.36 |
| $R_4$ | do | 493.0 |
| $R_{B2}$ | do | 46.0 |
| $C_1$ | microfarad | 0.02245 |
| $L_3$ | henry | 0.00910 |

It is to be understood that the above-described arrangements are only illustrative of the application of the principles of the invention. Numerous other arrangements may be devised by those skilled in the art without departing from the spirit and scope of the invention.

What is claimed is:

1. A symmetrical lattice network for simulating a section of smooth transmission line over a band extending between a frequency $f_1$ and a higher frequency $f_2$, each series branch of the lattice having an equivalent circuit which includes a resistor of value $R_{A1}$ and each diagonal branch being the equivalet of a resistor of value $R_{B2}$ in series with the parallel combination of a resistor of value $1/G_{B1}$ and a capacitor of value $B_1/2\pi f_1$, where $R_{A1}$ is the short-circuit resistance of a half section of the line at $f_1$, $R_{B2}$ is its open-circuit resistance at $f_2$, $G_{B1}$ its open-circuit conductance at $f_1$, and $B_{B1}$ its open-circuit susceptance at $f_1$.

2. A symmetrical lattice network for simulating a section or transmission line over a band extending between a frequency $f_1$ and a higher frequency $f_2$, each series branch of the lattice having at $f_1$ a resistance approximately equal to the short-circuit resistance of a half section of the line at $f_1$, and each diagonal branch being equivalent to the series combination of a resistor of value $R_{B2}$, an inductor of value $D/2\pi f_2$, and the parallel combination of a resistor of value $1/G_{B1}$ and a capacitor of value $B_{B1}/2\pi f_1$, where $R_{B2}$ is the open-circuit resistance of the half section at $f_2$, $G_{B1}$ its open-circuit conductance at $f_1$, $B_{B1}$ its open-circuit susceptance at $f_1$, and D the difference between the reactance of the capacitor and the open-circuit reactance of the half section at $f_2$.

3. A symmetrical lattice network for simulating a section of smooth transmission line over a band of frequencies extending between a frequency $f_1$ and a higher frequency $f_2$, each series branch of the lattice including the parallel combination of a resistor of value $R_{A1}$ and a capacitor of value $B_{A2}/2\pi f_2$ and each diagonal branch being the equivalent of a resistor of value $R_{B2}$ in series with the parallel combination of a resistor of value $1/G_{B1}$ and a capacitor of value $B_{B1}/2\pi f_1$, where $R_{A1}$ is the short-circuit resistance of a half section of the line at $f_1$, $B_{A2}$ is its short-circuit susceptance at $f_2$, $R_{B2}$ its open-circuit resistance at $f_2$, $G_{B1}$ its open-circuit conductance at $f_1$, and $B_{B1}$ its open-circuit susceptance at $f_1$.

4. A symmetrical lattice network for simulating a section of smooth transmission line over a band extending between a frequency $f_1$ and a higher frequency $f_2$, each series branch of the lattice being the equivalent of a resistor of value $R_{A1}$ in series with the parallel combination of a resistor of value $(D_R^2+D_X^2)/D_R$ and an inductor of value $(D_R^2+D_X^2)/2\pi f_2 D_X$ and each diagonal branch being the equivalent of a resistor of value $R_{B2}$ in series with the parallel combination of a resistor of value $1/G_{B1}$ and a capacitor of value $B_{B1}/2\pi f_1$, where $R_{A1}$ is the short-circuit resistance of a half section of the line at $f_1$, $D_R$ the difference between its short-circuit resistances at $f_2$ and $f_1$, $D_X$ the difference between its short-circuit reactances at $f_2$ and $f_1$, $R_{B2}$ its open-circuit resistance at $f_2$, $G_{B1}$ its open-circuit conductance at $f_1$, and $B_{B1}$ its open-circuit susceptance at $f_1$.

References Cited in the file of this patent

UNITED STATES PATENTS 1,760,973 Zobel ------------------ June 3, 1930

OTHER REFERENCES

Weinberg: A General RLC Synthesis Procedure; Proceedings of the IRE, February 1954, vol. 42, No. 2, pages 427–437.